INVENTORS
Elsa B. Reid
Katherine Davies
BY
ATTORNEYS

Patented Sept. 23, 1941

2,256,650

UNITED STATES PATENT OFFICE 2,256,650

SCRAPER AND CLEANER FOR EGG BEATERS AND THE LIKE

Elsa B. Reid, Portland, Oreg., and Katherine Davies, Cle Elum, Wash.

Application August 10, 1940, Serial No. 352,126

5 Claims. (Cl. 15—245)

This invention relates in general to scrapers and cleaners for cooking implements and utensils, and, more specifically, to cleaners for food mixers, such as dover egg beaters and the like.

Egg beaters and similar food mixers are hard to clean in the ordinary washing due to the clinging of food to their curved blades, and this is particularly true when such implements are allowed to stand for any length of time before being washed and thus giving the food materials opportunity to dry on the blades. In such case it is necessary generally to scrape the blades in order to remove the particles of food material for the purpose of cleaning the beater or mixer. However, on account of the curved shape of the blades of the beaters, as well as the close proximity of the blades to each other, it is impossible to get one's fingers in between the blades for the purpose of scraping the blades. Ordinary knives also are not suitable for performing such scraping action, since the blades of knives are more or less rigid and thus are made to follow the curved contour of the beater blades with some difficulty, even if the knife is small enough to get between the beater blades.

Another well-known fact attending the use of egg beaters and similar food mixers is that a certain amount of the food materials are wasted since these cling to the blades of the implements after the beating or mixing.

The object of this invention is to provide a cleaner designed primarily for scraping the food from the blades of egg beaters and other food mixers and to facilitate the work required in removal of such material from the blades.

Another object of this invention is to provide such a cleaner which will be very simple and inexpensive to manufacture.

These and incidental objects we attain by providing a cleaner with a semi-flexible bifurcated blade so shaped as to be capable of scraping both sides of an egg beater blade at the same time, and by otherwise forming the cleaner in the manner hereinafter briefly described with reference to the accompanying drawing.

Figure 1:
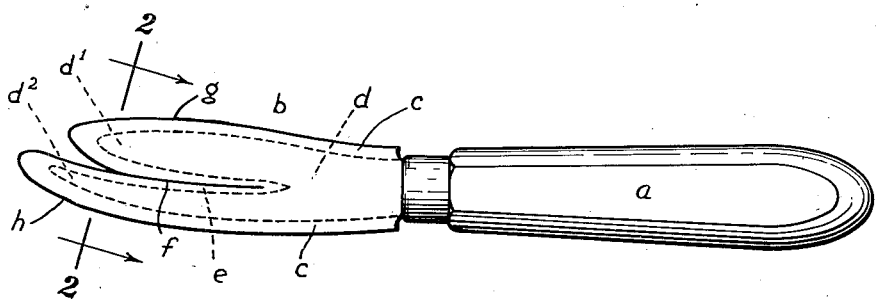
Figure 1 is an elevation of our cleaner and scraper.

Our scraper and cleaner comprises a handle $a$ made of wood, Bakelite, rubber, or any other suitable material or composition. The handle may be of any convenient size and shape, but we prefer to have it of a shape and size similar to that of a handle of an ordinary small kitchen knife, as illustrated in Figure 1.

The blade portion $b$, which is set in, or otherwise secured to the handle $a$, in any suitable manner, constitutes a flat, curved, bifurcated blade shaped substantially as shown. This blade may be made entirely of rubber or of any suitable flexible material having sufficient stiffness and resiliency, or it may be formed of rubber with an inner reinforcement. We have found it most practical to make the blade with an inner reinforcement $d$ of light flexible steel, the shape of this inner steel reinforcement or blade being shown by the broken line in Figure 1. This inner reinforcement is enclosed in a suitable coating of rubber, the rubber extending beyond the edges of the inner metal reinforcement, preferably for a distance of approximately one-eighth of an inch or more, and thus providing a resilient thin rubber edge $c$ extending entirely around the blade.

The thin inner flexible metal reinforcement $d$ is formed with two prongs $d'$ and $d^2$, one of which, $d^2$, is longer than the other. We have found it practical to have these prongs differently-shaped with the longer one preferably narrower than the other, for a reason which will be explained later. The slot $e$ between these prongs is extended inwardly a substantial distance towards the handle, and this slot in the flexible metal reinforcement $d$ is made sufficiently wide so that the margin or edging $c$ of the rubber covering will extend along both sides of the slot. The adjacent marginal edges of the rubber are made to touch each other along the center line $f$. Thus, when the blade of an egg beater is inserted in the slot, both sides of the blade will be scraped at the same time.

Sections of the blades of the egg beater or mixer, which are more difficult of access, may be reached by the comparatively narrow tip of the elongated prong of the scraper. It is for this reason that one prong of the scraper or cleaner is made longer than the other and is formed with a relatively narrow tip so that it may easily reach into otherwise inaccessible parts for the removal of collected food material. It will be found that the blades of the average beater or mixer can be scraped clean very quickly and with but very few strokes of the bifurcated scraper. By holding the beater over the food mixing bowl, during such scraping, the food material removed from the beater blades will drop back into the bowl and thus will prevent any waste of such food materials.

Finally, when the food which has been beaten or mixed is to be poured from the mixing bowl, the scraper may be used also for scraping the inside of the bowl. For this purpose the edges *g* and *h* are curved so as to correspond to usual curvatures of ordinary mixing bowls of different sizes. This rubber-edged scraper will work much more quickly and efficiently than an ordinary spoon or kitchen knife for scraping the food from the inside of the mixing bowl.

Figure 2:
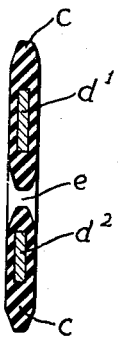
Figure 2 is a transverse section taken on line 2—2 of Figure 1 but drawn to a larger scale.
Figure 3:
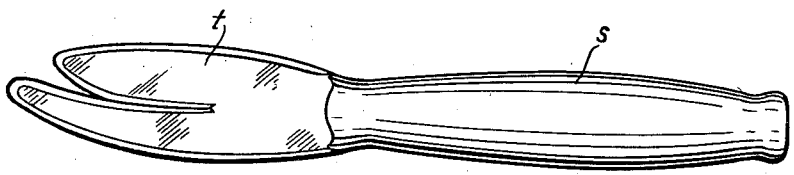
Figure 3 illustrates another form in which our cleaner and scraper may be made.

While we have shown our scraper in Figures 1 and 2, as made with an inside metal reinforcement for the blade, it is also possible to make the handle and blade from solid rubber, with the blade of flexible rubber and an integral handle of non-flexible rubber. Such construction is illustrated in Figure 3. In this figure the handle *s* is formed preferably of non-flexible rubber or similar material, and the thinner, semi-flexible blade *t* is made integral with the handle. In this modified construction we believe it preferable to have the blade somewhat thicker than the blade in the construction shown in Figure 1, to prevent the blade from becoming too flexible or weak. When the blade is made thicker, the edges should be reduced in thickness or beveled, in order to provide the thin flexible scraping edges which we have found to be so desirable in scraping the beater blades and removing food particles quickly and easily from beater and bowl. Our scraper in this form could also be made, if desired, with reinforcement in handle and blade.

Various modifications might be made in the construction of our scraper and cleaner without departing from the principle of our invention. Changes could also be made in the curvature of the outside edges of the scraper blade, although we have found that a slight curvature, substantially as illustrated, is very suitable for all practical purposes. It is essential that the blade be formed with a substantial slot, with flexible marginal walls, coming approximately together along the slot, in order to provide satisfactory scraping of both sides of the beater blades at the same time, and with a sufficiently wide entrance into such aperture or slot to facilitate the entering of the beater or mixer blade therein. Otherwise it is not our intention to limit our invention except as set forth in the appended claims.

We claim:
1. A scraper and cleaner of the character described comprising, a substantially flat, bifurcated blade having two projections with a long narrow slot therebetween, one of said projections being longer than the other, the edges of said blade being curved, said blade formed of flexible material with an inner reinforcement of metal, and a handle for said blade.

2. A scraper and cleaner of the character described comprising, a bifurcated blade having two projections with a long narrow slot therebetween, one of said projections being longer than the other, the edges of said projections of said blade being curved, said blade formed of rubber and having an inner reinforcement of metal, and a handle of non-flexible material.

3. A scraper and cleaner of the character described comprising, a bifurcated blade having two projections with a long narrow slot therebetween, one of said projections being longer and narrower than the other, the edges of said blade being curved, said blade formed of thin metal with a coating of flexible material, said coating extending a substantial distance beyond the edges of the metal, and a handle of non-flexible material for said blade.

4. A scraper and cleaner of the character described comprising, a substantially flat, semi-flexible bifurcated blade having two projections with a long narrow slot therebetween, one of said projections being longer than the other, said blade formed of rubber with an inner reinforcement of metal, and a handle of non-flexible material.

5. A scraper and cleaner of the character described comprising a semi-flexible, substantially flat, bifurcated blade having two projections with a long narrow slot therebetween, the tips of said projections being narrowed and spaced from each other, one of said projections being longer and narrower at the top than the other, the outside and inside edges of said projections of said blade being flexible and curved, said inside edges touching each other for a substantial distance along the center line of the blade, and a handle for said blade.

ELSA B. REID.
KATHERINE DAVIES.